United States Patent
Leroux et al.

(10) Patent No.: US 10,506,466 B2
(45) Date of Patent: Dec. 10, 2019

(54) SYSTEM AND METHOD FOR COORDINATING UPLINK TRANSMISSIONS BASED ON BACKHAUL CONDITIONS

(71) Applicants: Philippe Leroux, Ottawa (CA); Aaron Callard, Ottawa (CA)

(72) Inventors: Philippe Leroux, Ottawa (CA); Aaron Callard, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 140 days.

(21) Appl. No.: 14/827,819

(22) Filed: Aug. 17, 2015

(65) Prior Publication Data
US 2017/0055175 A1    Feb. 23, 2017

(51) Int. Cl.
*H04W 28/02* (2009.01)
*H04W 72/12* (2009.01)

(52) U.S. Cl.
CPC ... *H04W 28/0231* (2013.01); *H04W 72/1268* (2013.01)

(58) Field of Classification Search
CPC ............. H04W 28/0231; H04W 72/14; H04W 72/1268
See application file for complete search history.

(56) References Cited

U.S. PATENT DOCUMENTS

| | | | |
|---|---|---|---|
| 9,265,060 B1* | 2/2016 | Zhou | H04W 36/30 |
| 2003/0125040 A1* | 7/2003 | Walton | H04B 7/0417 |
| | | | 455/454 |
| 2003/0202511 A1* | 10/2003 | Sreejith | H04L 45/00 |
| | | | 370/389 |
| 2006/0268689 A1* | 11/2006 | Tarraf | H04L 47/10 |
| | | | 370/229 |
| 2012/0106432 A1 | 5/2012 | Lee et al. | |
| 2013/0044709 A1* | 2/2013 | Adjakple | H04W 76/15 |
| | | | 370/329 |
| 2013/0201902 A1 | 8/2013 | Nagata et al. | |
| 2013/0272170 A1* | 10/2013 | Chatterjee | H04W 28/02 |
| | | | 370/280 |

(Continued)

FOREIGN PATENT DOCUMENTS

| CN | 101867406 A | 10/2010 |
|---|---|---|
| CN | 102064878 A | 5/2011 |

(Continued)

OTHER PUBLICATIONS

International Search Report dated Oct. 28, 2016 for International Patent Application No. PCT/CN2016/091895 filed Jul. 27, 2016.

(Continued)

*Primary Examiner* — Alex Skripnikov
*Assistant Examiner* — Sharmin Chowdhury

(57) ABSTRACT

Embodiments of the present disclosure are directed towards a communications system and uplink transmission method which may dynamically adapt to changing conditions of the backhaul network. A traffic engineering element (TEE) is disclosed which receives a request from at least one wireless device for uplink data transmission. The TEE then determines the backhaul conditions of the backhaul network and coordinates uplink data transmissions from at least one wireless device to one or more receivers dependent on the determined backhaul conditions.

24 Claims, 9 Drawing Sheets

(56) References Cited

U.S. PATENT DOCUMENTS

| | | | |
|---|---|---|---|
| 2014/0029584 A1 | 1/2014 | Qu et al. | |
| 2015/0326426 A1* | 11/2015 | Luo | H04L 49/25 370/218 |
| 2015/0334739 A1* | 11/2015 | Yan | H04W 72/1284 370/329 |
| 2016/0007337 A1* | 1/2016 | Hessler | H04B 7/024 370/230 |
| 2016/0057679 A1* | 2/2016 | Werner | H04W 28/08 455/444 |
| 2016/0150460 A1 | 5/2016 | Leroux | |
| 2016/0278027 A1 | 9/2016 | Leroux | |
| 2017/0005706 A1* | 1/2017 | Khoshnevisan | H04B 7/024 |
| 2017/0063435 A1* | 3/2017 | Christensson | H04B 7/024 |
| 2017/0104559 A1 | 4/2017 | Palanki et al. | |

FOREIGN PATENT DOCUMENTS

| | | | |
|---|---|---|---|
| CN | 102197698 A | 9/2011 | |
| CN | 102387553 A | 3/2012 | |
| CN | 104509191 A | 4/2015 | |
| EP | 2830382 A1 | 1/2015 | |
| WO | WO 2014135186 A1 * | 9/2014 | H04B 7/024 |
| WO | 2015110064 A1 | 7/2015 | |

OTHER PUBLICATIONS

English Abstract of CN102064878.
English Abstract of CN104509191.

* cited by examiner

SYSTEM AND METHOD FOR COORDINATING UPLINK TRANSMISSIONS BASED ON BACKHAUL CONDITIONS

FIELD OF THE DISCLOSURE

The present disclosure relates to network communications and, more particularly, to a system and method for coordinating uplink transmissions in a communications system.

BACKGROUND

With the growth of wireless communications networks, and in particular with the growth of applications which involve user equipment transmitting increasing volumes of data, joint transmission schemes have been implemented in an effort to improve transmission coverage, throughput, and service quality. These schemes allow for data to be transmitted between wireless devices and multiple access points (APs). There is a need for systems which improve the efficiency of such networks to accommodate uplink transmissions from wireless devices.

SUMMARY

An object of the present disclosure is to provide methods and systems for coordinating uplink transmissions between wireless devices and one or more receivers. in certain embodiments, the disclosed methods and systems are adaptable to network characteristics, such as backhaul conditions. Embodiments of the present disclosure are directed towards a communications system and uplink transmission method which can dynamically adapt to changing conditions of the backhaul network.

According to an aspect of the disclosure, a traffic engineering (TE) element is disclosed which receives a request from at least one wireless device for uplink data transmission. The TE element then determines the backhaul conditions of the backhaul network and coordinates uplink data transmissions from at least one wireless device to one or more receivers dependent on the determined backhaul conditions. This allows the system to balance traffic on the backhaul network.

According to another aspect of the disclosure, a method for balancing data transmissions in a communications system including a plurality of receivers and a backhaul network is disclosed. In some embodiments, such a method is implemented by a TE element. The method includes receiving a request from at least one wireless device for uplink data transmission. The backhaul conditions of the backhaul network are determined in order to coordinate uplink data transmissions from at least one wireless device to one or more receivers of the plurality of receivers dependent on the determined backhaul conditions. This allows for balancing the traffic on the backhaul network, In some embodiments, such a method includes determining a transmission strategy according to the backhaul conditions, wherein coordinating uplink data transmission is performed according to the determined transmission strategy. In some embodiments, the wireless device is instructed to transmit the uplink data to each of the first and second receivers at transmission rates matching the available bandwidth of their respectively connected backhaul links. In some embodiments, the method includes computing scheduling parameters dependent on said backhaul conditions which are then provided to one or more schedulers for scheduling the at least one wireless device to transmit the uplink data to one or more receivers consistent with the scheduling parameters. In some embodiments, the method further includes transmitting grants from one or more schedulers to the at least one wireless device, wherein the grants are constrained by the scheduling parameters. For any of these embodiments, the method can further include determining wireless conditions and the uplink transmissions are coordinated dependent on both the determined backhaul conditions and the determined wireless network information. In some embodiments, the system determines ongoing changes to the backhaul conditions and wireless network conditions, and if necessary provides updated scheduling parameters to the schedulers, effectively coordinating the uplink data transmissions on an ongoing basis. In some embodiments, the system evaluates a plurality of potential transmission strategies and selects one to use to coordinate the uplink data transmissions. For any of these embodiments, the system can instantiate one or more schedulers which are then associated with one or more receivers. The instantiated schedulers then schedule the wireless devices to transmit the uplink data to one or more receivers. In some embodiments, the system assigns wireless devices to schedulers, and such an assignment need not have a one-to-one correspondence between schedulers and wireless devices. For example, a wireless device can be scheduled by more than one instantiated scheduler, and a group of wireless devices can be assigned to any one scheduler. Further, in some embodiments the instantiated schedulers need not have a one-to-one correspondence with the receivers. A scheduler can control more than one receiver, and/or a receiver can receive transmissions from wireless devices scheduled by more than one scheduler. In some embodiments, the schedulers determine rates of data, power masks and Modulation and Coding Scheme (MCS) masks in order to enable proper reception at receivers while balancing wireless and backhaul resources.

According to another aspect of the present disclosure, there is provided a traffic engineering element (TEE). Such a traffic engineering element includes: a network interface for communicating with network elements and for receiving uplink requests from wireless devices, a processor, and machine readable memory. The machine readable memory stores executable instructions for execution by said processor. The executable instructions, when executed, cause said TEE to determine backhaul conditions of a backhaul network. The instructions also cause said TEE to coordinate uplink data transmissions from wireless devices to one or more of the receivers dependent on the determined backhaul conditions.

According to another aspect of the present disclosure, there is provided a communications system including a plurality of receivers for receiving uplink data transmissions from wireless devices, a backhaul network, and a traffic engineering element. The backhaul network can include one or more gateway nodes for routing uplink data to an external network. The traffic engineering element includes a processor and a memory having recorded instructions for execution by the processor. These instructions, once executed, cause the traffic engineering element to receive a transmission request from a wireless device via one or more receivers, determine backhaul conditions of the backhaul network and coordinate uplink data transmissions from the wireless devices to one or more of the plurality of receivers according to the determined backhaul conditions.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF EMBODIMENTS

Conventional joint transmission schemes, such as Co-ordinated MultiPoint transmission/reception (CoMP) for Long Term Evolution (LTE) and LTE-advanced systems, require high throughput speeds and fast connectivity between participating Access Points (APs) in order to exchange the high volume of information necessary for coordinating execution of a joint transmission scheme. The intermediate links between the APs and the core network, through which the information is exchanged, are known as the backhaul network of the communications system. CoMP systems often require high throughput through the backhaul network in order to combine and interpret signals received from multiple APs. Unfortunately, as the backhaul network becomes congested, traditional joint transmission schemes, such as CoMP, may lose effectiveness. Accordingly, alternative joint transmission schemes which adapt to conditions of the backhaul network are desired.

Embodiments of the present disclosure are directed towards a communications system and uplink transmission method which can dynamically adapt to changing conditions of the backhaul network. By providing an uplink transmission method which adapts to changing characteristics of the backhaul network, system efficiency may be improved, as compared to CoMP systems which may lose effectiveness due to backhaul constraints.

Figure 1:
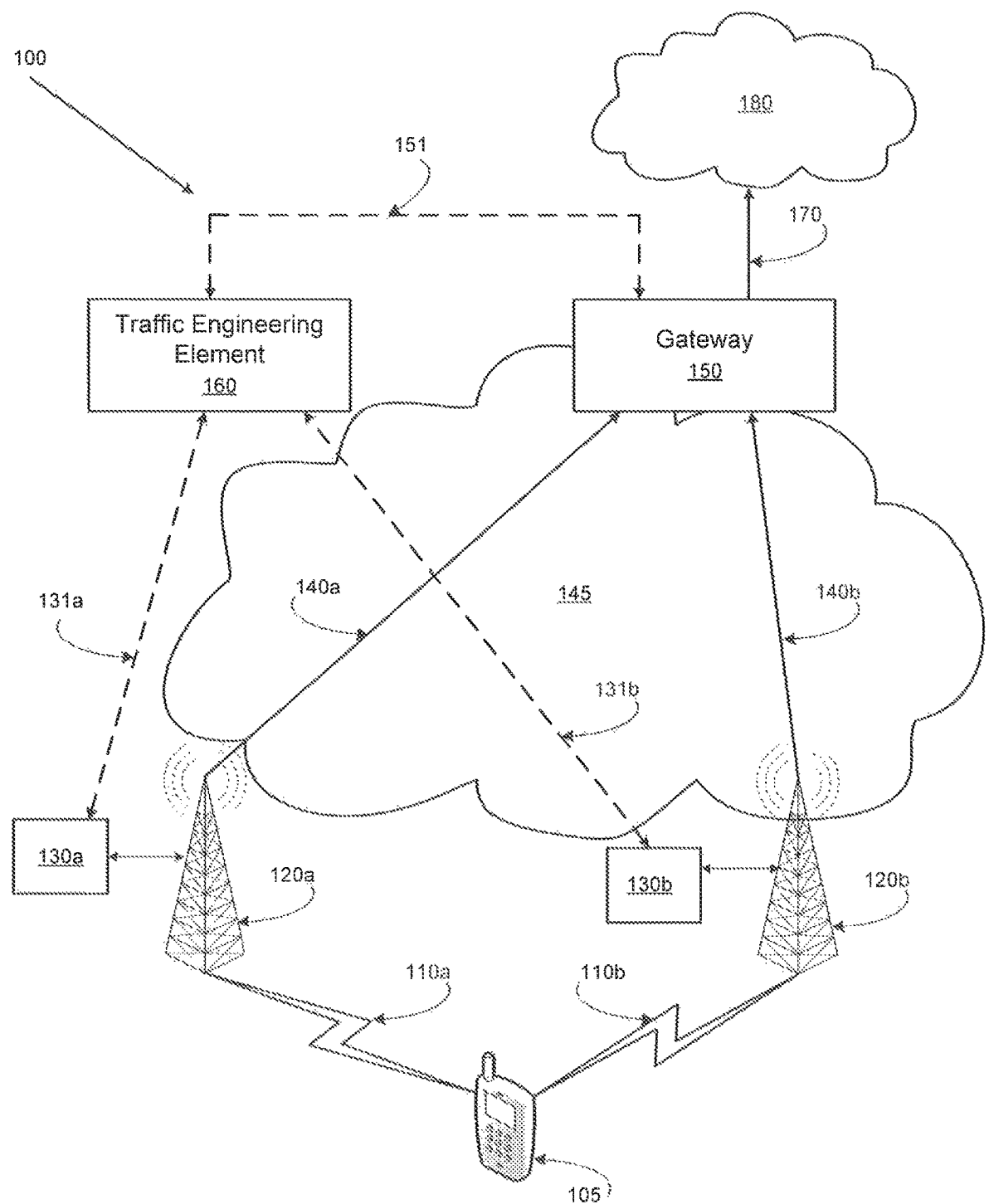
FIG. 1 illustrates a communications network according to an embodiment

Referring to FIG. 1, there is shown an example communications system 100. The communications system 100 includes first and second receivers 120a, 120b, communicatively coupled to a gateway node 150 through a backhaul network 145 including backhaul links 140a, 140b, Wireless device 105, for example a User Equipment (UE), exchanges data with the communications system 100 through the receivers 120a, 120b via interfaces 110a and 110b, as will be further discussed below. The gateway node 150 may be coupled to a core network, network components, or additional networks 180 through network link 170. In an embodiment, controllers 130a, 130b are respectively associated with receivers 120a, 120b for coordinating uplink data transmission from UE 105 to the receivers. In some nodes, there can be a one-to-one correspondence between a controller and receiver, which can be integrated together in a base station or access point (AP), for example an evolved Node B (eNB), However, in other embodiments there need not be a one-to-one correspondence between the controllers and receivers, in which case the controllers and receivers can be separate entities in communication with each other. Further, in this specification, a "receiver" could be an AP that only operates in uplink, an AP that operates in both uplink and downlink, or any network node with some processing capability that receives data for transmission through the backhaul, such as a remote radio head (RRH). A traffic engineering (TE) element (TEE) 160 is communicatively coupled via control plane links 151, 131a and 131b, shown as dotted lines, to gateway node 150 and controllers 130a, 130b. TEE 160 can be a separate network element or be instantiated in a network element or in a separate computer. TEE 160 receives backhaul information, and optionally wireless network status information, and provides an uplink transmission strategy to the controllers 130a, 130b in order to coordinate uplink transmissions between UE 105 and receivers 120a, 120b.

While FIG. 1 illustrates a particular embodiment of the communications system 100, its composition can vary in other embodiments. For example, the communications system 100 can include any number of receivers each communicatively coupled to gateway 150 through a backhaul network via respective backhaul links. Also, while a single wireless device is shown in FIG. 1, any number of wireless devices can each be communicatively coupled to any number of receivers via respective radio interfaces. Further, while controllers 130a, 130b are shown independent of their associated receivers 120a, 120b, a number of other associations may exist in other embodiments. As one example, a receiver can be part of an eNodeB, in which case the controller (and associated scheduler) is integrated with the receiver. In other embodiments, a single controller can control a plurality of remote radio heads. For example, a single controller 130a can be associated with both receivers 120a, 120b in the communications system 100, or any number of remote radio heads in other embodiments. In embodiments where there is not a one-to-one correspondence between the controllers and the receivers, the schedulers may be instantiated by TEE 160 when and where needed, as discussed in more detail below with reference to FIG. 8.

Wireless device 105 can include any device configured for communications with receivers 120a, 120b of the communications system 100. For example, wireless device 105 can be a user equipment device such as a cellular phone, a smart phone, a tablet, a wireless transmit/receive unit, a laptop, a personal digital assistant (PDA), or another consumer electronics device. Alternatively, the wireless device can be a data collection/transmission unit (e.g., a smart meter) which uses machine-type communication. Other examples of wireless devices include a gaming unit, a set top box, or the like. In certain embodiments, wireless device 105 can include a network node such as a switch, router, hub or access point.

Receivers 120a, 120b can include any device configured for communications with one or more wireless devices within communications system 100. For example, receivers 120a, 120b can include antennas, base stations (BS), base transceiver stations (BTS), Node-Bs, evolved Node-Bs (eNBs), home Node-Bs, home eNodeBs, site controllers, access points (AP), and wireless routers. Further, while receivers 120a, 120b are shown as single elements in FIG. 1, in other embodiments they can each include a number of interconnected receivers or network elements (not shown) such as a plurality of remote radio heads.

Interfaces 110a, 110b, which communicatively couple wireless device 105 to receivers 120a, 120b, can include any suitable wireless communications interface, including radio frequency (RF), microwave, infrared (IR), or the like. Communications system 100 can employ any suitable radio access technology (RAT) or channel access scheme for communication between wireless device 105 and receivers 120a, 120b, such as CDMA, TDMA, FDMA, OFDMA, SC-FDMA, wideband CDMA (WCDMA), high-speed packet access (HSPA), evolved HSPA (HSPA+), high-speed downlink packet access (HSDPA), high-speed uplink packet access (HSUPA), long term evolution (LTE), LTE advanced (LTE-A), universal mobile telecommunications system (UMTS), terrestrial radio access (UTRA), evolved UMTS terrestrial radio access (E-UTRA), IEE 802.16 (Le worldwide interoperably for microwave access (WiMAX)), CDMA2000, CDMA2000 IX, CDMA2000 EV-DO, interim standard 2000 (IS-2000), interim standard 95 (IS-95), interim standard 856 (IS-856), global system for mobile communications (GSM), enhanced data rates for GSM evolution (EDGE), GSM EDGE (GERAN), and the like.

TEE 160 may include an independent device component as shown in FIG. 1, a software defined network (SDN) component, or a program deployed on a different device platform of the communications system 100. For example, TEE 160 may include a real-time or reactive program executed on a network compatible device coupled to the network. As described above with reference to FIG. 1, TEE 160 obtains information about the backhaul conditions and wireless network information, and provides a transmission strategy to the controllers 130a, 130b for coordinating uplink transmissions from wireless device 105 to receivers 120a, 120b. However, TEE 160 can provide the transmission strategy to different or additional components in other embodiments.

As stated, controllers 130a, 130b, while shown as device components separate from receivers 120a, 120b in FIG. 1, can be deployed on the same device platform as receivers 120a, 120b. Controllers 130a, 130b can also include functional objects or programs deployed on other device platforms of the communications system 100, such as on TEE 160, or through a network compatible device (not shown) coupled to network link 170. For example, TEE 160 can dynamically instantiate controllers for operation and execution on the network element which hosts the TEE functionality. Further TEE can dynamically instantiate distributed controllers as needed and in proximity to receivers, as will be discussed below with reference to FIG. 8.

Backhaul network 145, including backhaul links 140a, 140b coupling receivers 120a, 120b to gateway node 150, can include any suitable collection of components which permit data exchange between receivers 120a, 120b and gateway node 150. For example, the backhaul network can include any number of networks and/or nodes (e.g., routers), such as a multi-hop or mesh network.

Additionally, backhaul links 140a, 140b can include single or multiple wired, wireless, or other suitable communications links. Further, in some embodiments the backhaul links do not couple the receivers to a gateway node, but to another node that routes signals directly from receiver 120a to receiver 120b. Accordingly, some embodiments include a backhaul network which allows for a flow from one wireless device to another without passing through a gateway exit of the backhaul. Such embodiments can include a node in the backhaul network that receives and forwards data from such a flow.

Figure 2:
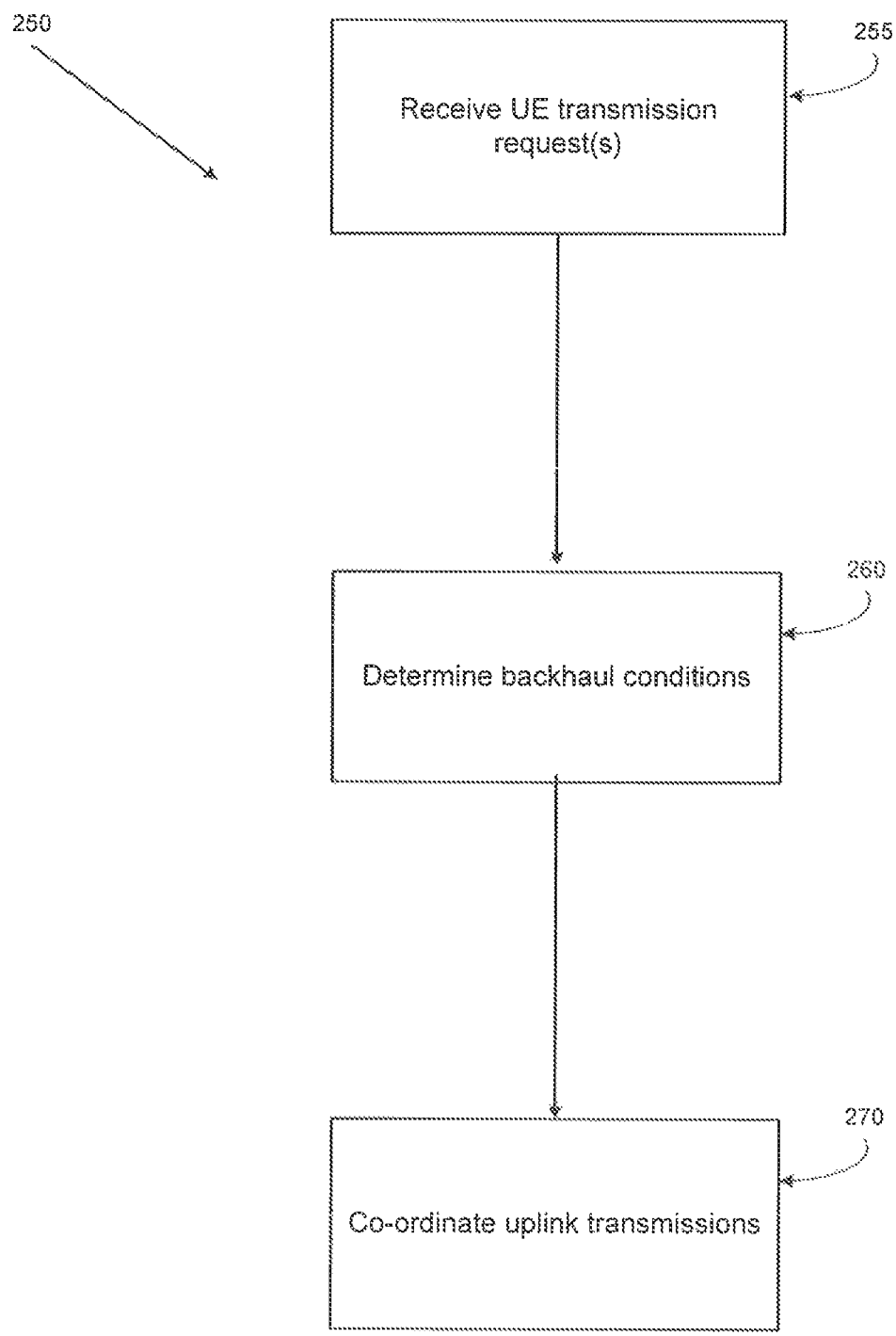
FIG. 2 is a flowchart for co-ordinating uplink data transmissions according to an embodiment.

Referring to FIG. 2, an embodiment of a method 250 for coordinating uplink data transmissions, with communications system 100 of FIG. 1 for example, is now described.

At 255, TEE 160 receives a UE transmission request, for example from one or more of the receivers. At 260, TEE 160 determines backhaul conditions of the backhaul network 145 including backhaul links 140a, 140b. In some embodiments, the TEE 160 determines the backhaul conditions based on information received from network elements. At 270, TEE 160 coordinates uplink transmissions from wireless device 105 to one or more receivers 120a, 120b based on the backhaul conditions and on the request, in order to balance traffic on the backhaul network. It should be appreciated that the request either implicitly or explicitly provides some information about the wireless network which is used by TEE 160 (for example which receivers have received and forwarded the request). In some embodiments, TEE 160 receives additional wireless network information.

Figure 3:
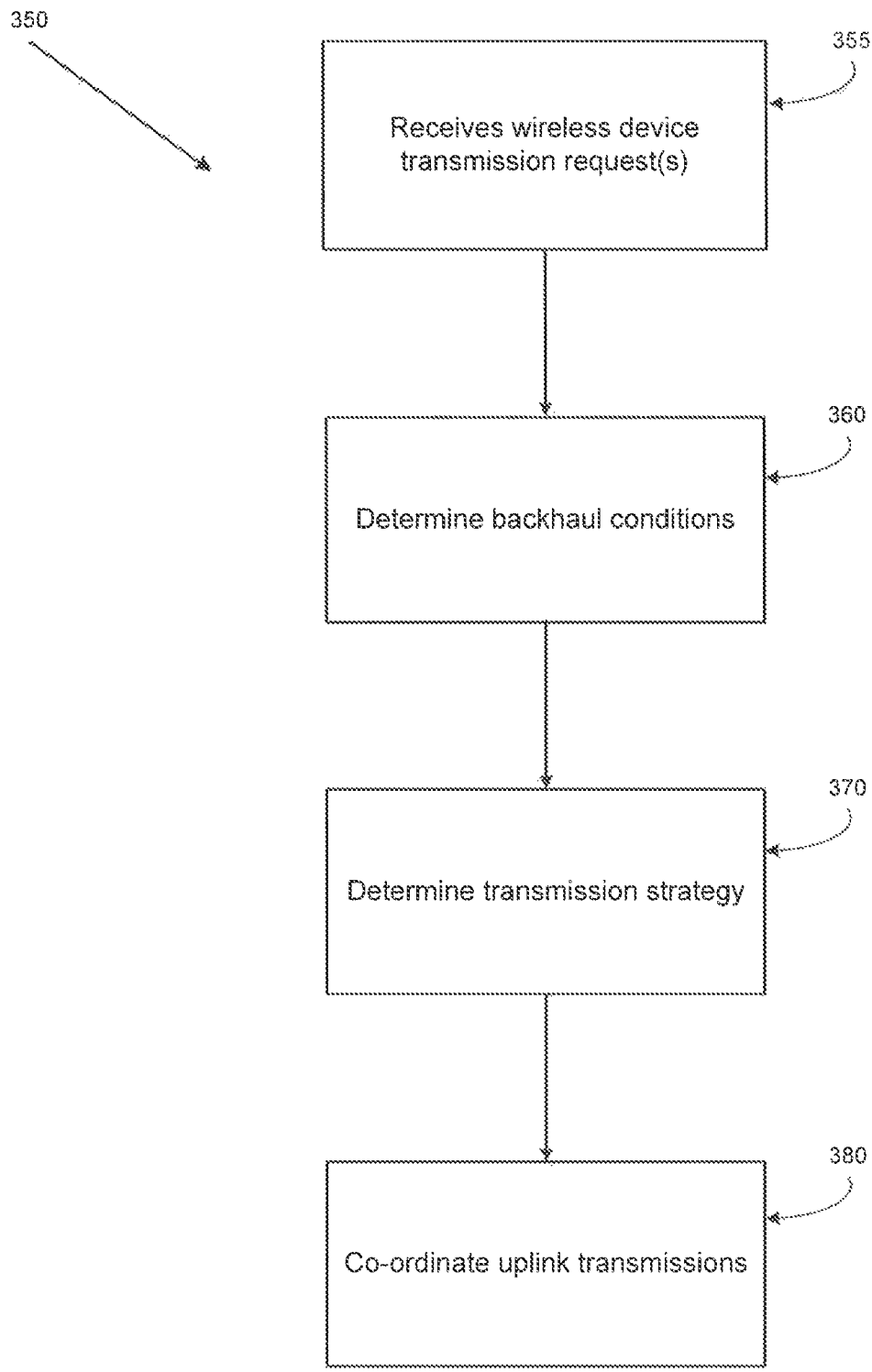
FIG. 3 is a flowchart for co-ordinating uplink data transmissions according to another embodiment.

FIG. 3 illustrates another embodiment of a method 350 for coordinating uplink data transmissions. At 355, TEE 160 receives a transmission request, for example from one or more of the receivers. At 360, TEE 160 determines backhaul conditions of the backhaul network 145 including backhaul links 140a, 140b, for example based on information about the backhaul conditions received from network elements. At 370, TEE 160 uses the determined backhaul conditions to determine a transmission strategy. At 380, TEE 160 co-ordinates uplink transmissions by communicating with controllers 130a, 130b to coordinate uplink transmissions from wireless device 105 to one or more of the receivers 120a, 120b based on the transmission strategy.

For example, if backhaul link 140b is relatively more congested than backhaul link 140a, embodiments can implement a transmission strategy to help alleviate the backhaul congestion at backhaul link 140b. For example, the transmission strategy can include assigning wireless device 105 to transmit solely to receiver 120a. Alternatively, wireless device 105 can transmit to both receivers but the transmission strategy can include assigning a larger proportion of uplink data to be transmitted from wireless device 105 to receiver 120a than to receiver 120b. As another example, if backhaul links 140a and 140b have differing data transfer capacities, or different available bandwidth at any given time, the transmission strategy can include assigning wireless device 105 to transmit simultaneously to both receivers 120a, 120b at different transmission rates to balance the available bandwidth of the respective backhaul links 140a, 140b. Thus, transmission strategies can include re-routing uplink transmission paths to circumvent congested backhaul links 210a, 210b, and/or modifying uplink transmission parameters to alleviate congestion or utilize available bandwidth of backhaul links 140a, 140b.

As another example, TEE 160 can determine backhaul conditions of backhaul network 210 and determine a transmission strategy including utilizing conventional successive interference cancellation (SIC) techniques. For example, wireless device 105 can be instructed to transmit to receiver 120a, but using sufficient power and high modulation and coding scheme (MCS) to enable reception by receiver 120b. Receiver 120b will then detect the transmission from wireless device 104 and apply successive interference cancelation (SIC) to reduce interference caused by wireless device 105 for other wireless devices (not shown) which are transmitting to receiver 120b. As should be known to a person skilled in the art, SIC involves decoding interfering signals and successively subtracting the decoded interfering signals in order to decode a desired signal.

Depending on the circumstances, a transmission strategy for a given situation can involve selecting to which (single) receiver a given wireless device should transmit. Transmission strategies can also involve simultaneously transmitting to more than one receiver, in which case the transmission strategy can include the selection of scheduling parameters relating to transmission rates, MCS, power levels, etc. These and other specific transmission strategies will be discussed in greater detail below.

While the previous examples discussed an uplink transmission method applied to communications system 10 having depicted two receivers 120, 120b, and one wireless device 105, these examples are merely illustrative, and the method and system can support many additional receivers and wireless devices.

Further, and according to certain embodiments, TEE 160 instructs one or more controllers in the network to implement the transmission strategy. For example, once TEE 160 determines a transmission strategy, instructions are sent to controllers 130a, 130b to coordinate uplink data transmission between wireless device 105 and receivers 120a, 120b according to the transmission strategy. For example, controllers 130a, 130b coordinate scheduling, such that wireless device 105 transmits uplink data, and receivers 120a, 120b receive the transmitted uplink data at synchronized intervals according to a schedule. Accordingly, by determining and executing a transmission strategy dependent on backhaul conditions, overall efficiency of uplink data transmission can be improved, including balancing traffic on the backhaul network.

TEE 160 determines the backhaul conditions based on information about the backhaul conditions that it receives from network elements, This information can include: the status of buffers in backhaul node routers, and changes to the status of these buffers to determine whether (or how much) congestion exists: the identification of links with remaining capacity; the type of backhaul link (which can include microwave, fibre, multi-hop wireless, etc.); the bandwidth capacity (including the capacity of the nodes in the backhaul links); the latency on the backhaul links (including the speed and capacity of backhaul routers to process packets, and hops latency—e.g., the processing time of nodes acting as multi-hop wireless relays to retransmit signals for a wireless backhaul link); and the reliability of the links (e.g., if using a wireless backhaul, atmospheric and other conditions can potentially disrupt the links). This information about the backhaul conditions can be communicated to TEE 160, for example, by gateway node 180 and receivers 120a, 120b.

Backhaul network 210 may have levels of throughput and link quality that can change over time, based on factors such as device capability, traffic volume, and so forth. For example, the backhaul network can include mesh networks or dense multi-hop networks that are subject to varying network conditions and load.

The varying load placed on backhaul links 140a and 140b can result in congestion which can preclude date transmission through some links, or reduce uplink transmission efficiency via one or more of the receivers to gateway node 150. In certain instances, such congestion can preclude application of conventional multipoint transmission schemes such as CoMP. As will be discussed in further detail below, a transmission strategy can therefore be determined to alleviate, improve, or even balance certain backhaul restrictions or imbalances between backhaul links 140a, 140b.

Figure 4:
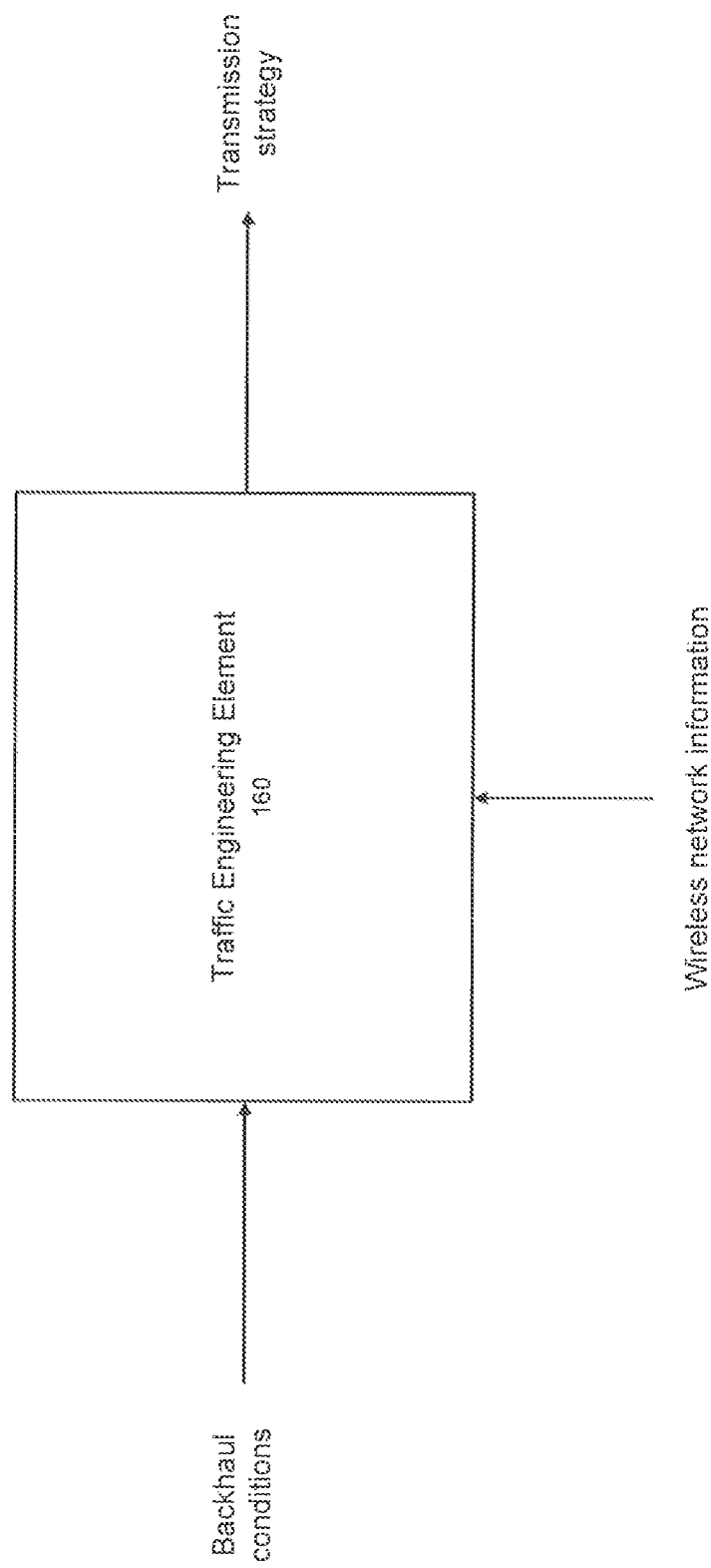
FIG. 4 is a block diagram schematically illustrating the inputs and outputs to a traffic engineering node, according to an embodiment.

FIG. 4 is a functional block diagram illustrating inputs to and outputs from TEE 160. As shown in FIG. 4, TEE 160 receives information about the backhaul conditions of the backhaul network, along with wireless network information. Based on at least the backhaul conditions, and optionally with additional wireless network information, TEE 160 determines a transmission strategy for coordinating uplink data transmissions, In one embodiment, TEE 160 includes a physical layer abstractor and one or more optimizers for determining the transmission strategy, as well as other components. The physical layer abstractor allows TEE 160 to evaluate the impact of strategies on the physical network (access link and backhaul). The optimizers can be traffic-engineering or access link provisioning optimizers, for example as discussed in U.S. Ser. No. 14/555,018 titled Network Abstractor for Advanced Interactive SDN Optimization, filed Nov. 26, 2014, which is hereby incorporated by reference in its entirety.

Examples of the types of information about the backhaul conditions received by TEE 160 are discussed above. The wireless network information used by the TEE can include: Channel State Information (CSI), Spectral Efficiency (SE), service demands (from UEs), Network status (from ANs or gateways), SNR (from UEs and/or ANs), reception strength/quality/loading, path losses, active flows and characteristics, uplink characteristics and models, ability to decode transmissions from particular wireless devices, wireless device demands (which include actual demands provided by an application running on a wireless device, or observed average demands given a wireless device buffer status over time), indications of whether beamforming and/or multiple input multiple output (MIMO) can be used for a link, and observed interference and transmission rates from wireless devices to particular receivers.

In certain embodiments, TEE 160 can perform additional functions including: instantiating controllers for coordinating uplink transmissions from wireless devices to receivers, assigning receivers and wireless devices to controllers, and determining whether a transmission should be directed to a single receiver or be a multipoint uplink transmission. For multipoint transmissions, TEE 160 computes and sends scheduling parameters to controllers and receivers including: MCS/power masks, FFR parameters and other parameters for coordinating multipoint uplink transmissions. In situations where a wireless device is transmitting to multiple receivers, such as in multipoint or cooperative systems, various network conditions such as spectral efficiency, redundancy, throughput, traffic balancing, and Quality of Service (QoS) can be considered in determining the transmission strategy.

As indicated above. TEE 160 can, in certain embodiments, instantiate schedulers in controllers 130a, 130b, or other controllers (not shown). Instantiated schedulers in turn schedule transmissions from wireless devices to receivers. Further, TEE 160 can also assign particular wireless devices and/or receivers to particular controllers. For example, TEE 160 can assign wireless device 105 and controller 130a to receiver 120a, according the determined transmission strategy.

The transmission strategy can alleviate, improve or balance certain backhaul restrictions or imbalances in the backhaul network, for example between backhaul links 140a, 140b of FIG. 1. In some embodiments, the transmission strategy can include a set of actions and/or restrictions which provide a framework for controllers 130a, 130b to coordinate uplink transmissions. The schedulers can consider such factors as scheduler coordination, multipoint reception targeting, modulation and coding schemes (MCS), power masking (to control interference), and fractional frequency reuse (FFR).

Figure 5:
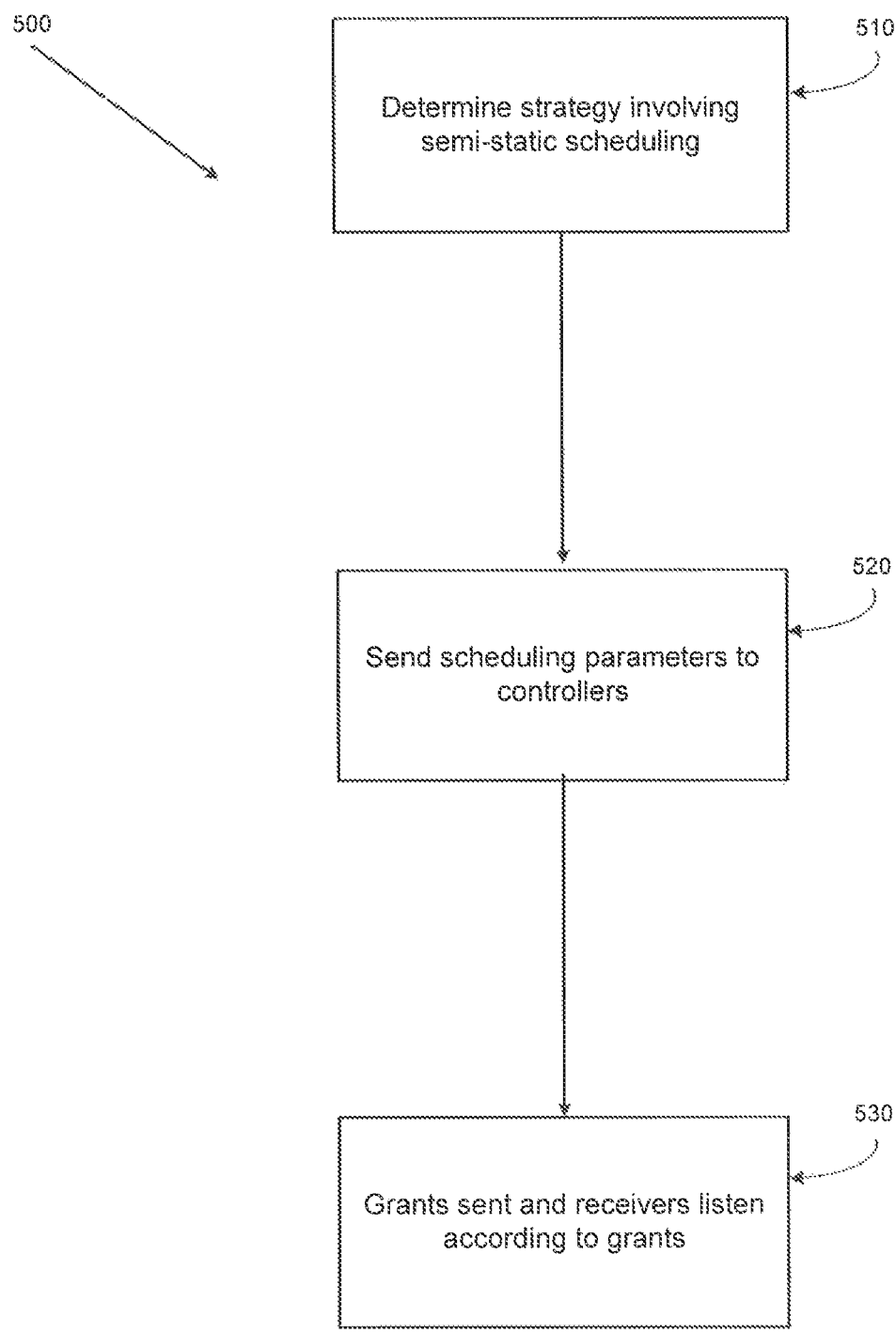
FIG. 5 is a flowchart for co-ordinating uplink data transmissions according to another embodiment.

Referring to FIG. 5, an embodiment of a method 500 for coordinating uplink data transmissions in communications system 100 of FIG. 1 is shown. In this example, there is a single UE and two receivers (which will be referred to as receiver 1 and receiver 2), wherein each receiver is controlled by a separate controller/scheduler (which will be referred to as controller 1 and controller 2). TEE 160 receives information about the backhaul conditions and wireless network conditions and, based on these, determines a strategy at 510. In this example, scheduling is based on a percentage allocation for each receiver. For example, if TEE 160 determines that the backhaul link from receiver 2 has more available bandwidth than the backhaul link from receiver 1, TEE 160 decides that a higher percentage the of the transmission should be received and decoded at receiver 2. In an embodiment, such a scheduling can be semi-static, and the TEE precomputes a semi-static scheduling identifying when each receiver should receive from the transmitting wireless device. At 520, the TEE sends scheduling parameters to the controllers. In this example, controller 1 controls receiver 1 and controller 2 controls receiver 2. The scheduling parameters configure controller 1 to compute and send grants to the wireless device based on the previously determined strategy. These scheduling parameters also inform controller 2 of the semi-static schedule so that controller 2 can schedule receiver 2 to actively attempt to decode and forward data from the wireless device, dependent on the semi-static schedule. At 530, controller 1 computes and sends the grants to the wireless device, which transmits according to the semi-static schedule 530. Both receivers listen according to the schedule. The schedule is semi-static, as the schedule can be altered depending on changing conditions of the wireless and backhaul links.

In embodiments, the transmission strategy takes into account multiple wireless devices transmitting to multiple receivers. In some embodiments, the transmission strategy optimizes each device to receiver link. In other embodiments, the transmission strategy can consider potential interference in order to co-ordinate multiple links together in order to improve overall performance. For example, a first interfering wireless device may be assigned a link which has both a good SE and no constrained backhaul conditions. However, the transmission parameters for this device can be changed in order to provide less interference with the transmission from a second wireless device. For example, a receiver can be enabled to apply SIC to the first interfering wireless device to effectively boost a link for a second wireless device. This can be desirable to balance backhaul conditions for situations when a receiver has a smaller access link capacity than backhaul capacity. In this example, TEE 160 instructs the first wireless device to use more power and a lower MCS than the device otherwise would if the transmissions were scheduled without regard to potential interference effects. This is done in order to make the transmission cause interference at the second access point. This interference can then be cancelled using conventional SIC techniques, which in effect improves the link for the second wireless device (i.e., provides a link with better SE) to the second receiver.

Additionally, the transmission strategy may include power masking transmissions from wireless device 105 to receiver 120*a* to control interference, in which case controllers 130*a*, 130*b* can send control information for transmission of attenuated uplink data.

As indicated above, controllers 130*a*, 130*b* receive the transmission strategy from TEE 160 and coordinate uplink data transmission between wireless device 105 and receivers 120*a*, 120*b* according to the transmission strategy.

In some embodiments, controllers 130*a*, 130*b* can include schedulers (not shown), in which case TEE 160 may send a transmission strategy including scheduling parameters to these controllers. For example, when the transmission strategy includes a scheduling directive, controllers 130*a*, 130*b* send grants to wireless device 105 and receivers 120*a*, 120*b* in order to coordinate transmission and reception of uplink data according to the schedule.

A scheduler executes real-time computation to co-ordinate communication parameters between wireless devices and receivers using available resources (e.g., timeslots, orthogonal codes, channel assignments, MCS, power, wireless links). These communication parameters are used to determine the grants that are made available for each wireless device. In other words, schedulers within controllers 130*a*, 130*b* attempt to optimize scheduling of resources for wireless devices under the control of each scheduler. To do this, the schedulers issue grants to the wireless devices based on the wireless network conditions. However, the schedulers are constrained by the scheduling parameters sent by the TEE, as part of the overall transmission strategy to co-ordinate uplink transmissions based on the backhaul conditions. As one example, the schedulers will typically determine the MCS a transmission should use based on the current wireless conditions and scheduling rules. However, the scheduling parameters act as constraints on the schedulers, for example by providing upper and/or lower bounds on the MCS which can be used for any given transmission in order to balance the backhaul conditions.

The scheduling parameters can include:
a. Rate parameters (e.g., total aggregated or per flow per UE);
b. MCS/power mask parameters (e.g., upper and/or lower bounds);
c. Resource Block (RB) restrictions (e.g., use only pairs of TTIs or use RB 1,3,5, . . . on TTIs 2,4,6, . . . ) (e.g., a FFR scheme);
d. Successive Interference Cancelation (SIC) parameters (e.g., whether SIC is enabled or not);
e. Receiver decoding parameters (e.g., for selecting or configuring the AN decoder, enabling MIMO or beamforming techniques, etc.);
f. Expected received interference from neighboring nodes on different resource blocks and precoders.

As stated, the schedulers perform the scheduling based on the wireless network conditions, but as constrained by the scheduling parameters received from the TEE. One example of how the schedulers can schedule subject to constraints is disclosed in U.S. Ser. No. 14/660,682 with title Controller Directives to Enable Multipoint Reception via MCS and Power Constraints Masks, and filed Mar. 17, 2015, which is hereby incorporated by reference in its entirety.

The following examples outline additional methods for performing uplink communications according to embodiments of the present disclosure.

Figure 6:
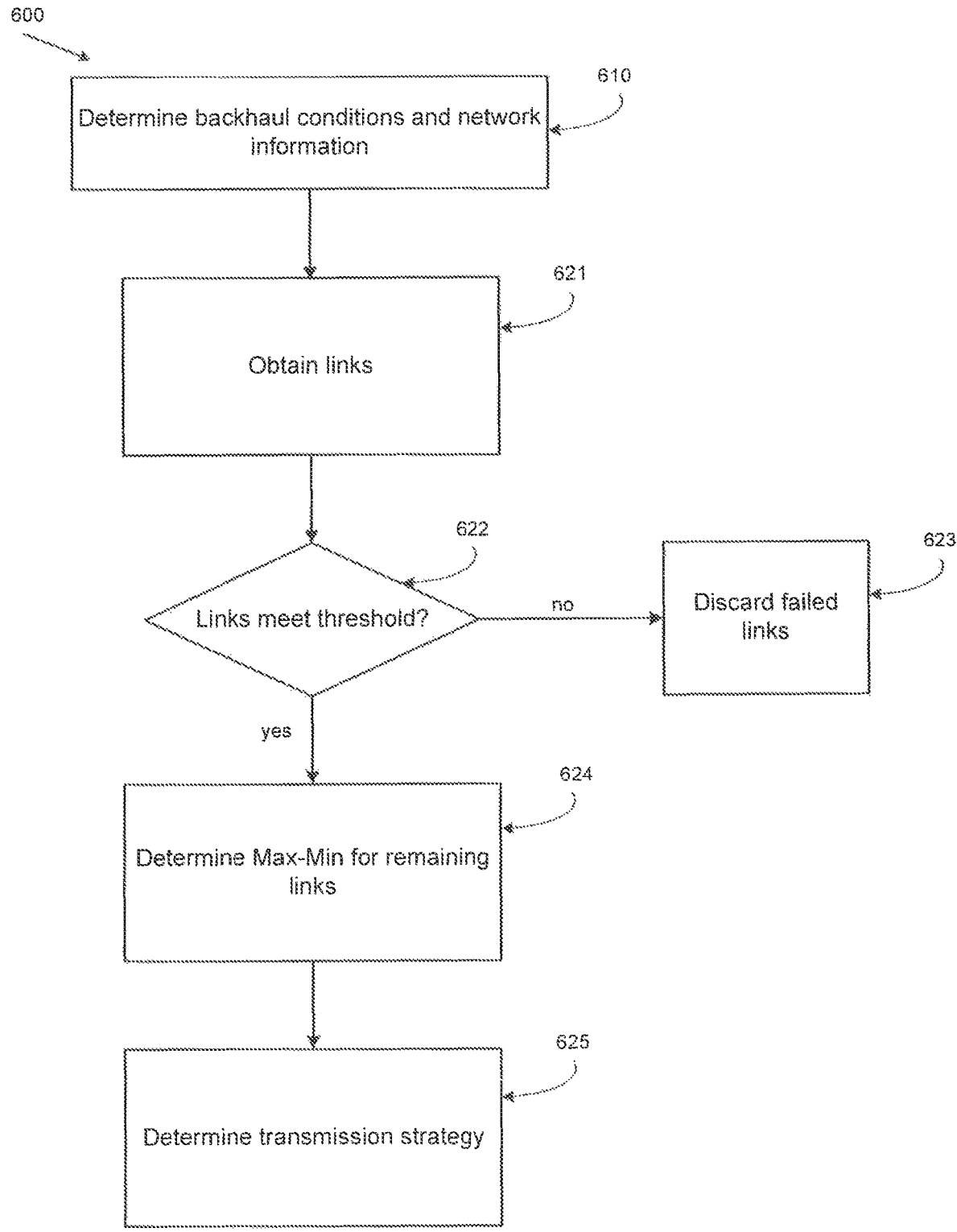
FIG. 6 is a flowchart for co-ordinating uplink data transmissions according to another embodiment.

Referring to FIG. 6, an embodiment of a method 600 for coordinating uplink data transmissions in communications system 100 is shown, where the transmission strategy includes scheduling the uplink data transmission from one or more wireless devices (for example UEs) to one or more receivers.

At 610, backhaul conditions and wireless network information are determined. At 621, the TEE obtains a set of possible links between the UEs and the receivers evaluated from a path loss map and spectral efficiency mapping. A simplified example assumes only two UEs (UE1 and UE2) and only two rates (R1 and R2), and only considers the power Pxy from UE x to receiver y. Ignoring other parameters (such as type of precoder and whether an appropriate spectral efficiency (SE) is achieved), the sets simultaneous active links is given by:

{(UE1,R1,P11)},
{(UE1,R2,P12)},
{(UE1,R1,P11),(UE1,R2,P12)},
{(UE2,R1,P21)},
{(UE2,R2,P22)},
{(UE2 R1,P21),(UE2,R2,P22)},
{(UE1,R1,P11),(UE2,R2,P12)},
{(UE1,R1,P11),(UE2,R1,P21)},
{(UEI,R2,P12),(UE2,R1,P21)},
{(UE1 ,R2,P12),(UE2,R2,P22)},
{(UE1,R1,P11),(UE1,R2,P12),(UE2,R2,P22)},
{(UE1,R1,P11),(UE2,R1,P21),(UE2,R2,P22)},
{(UE1,R1 ,P11),(UE1,R2,P12), (UE2,R1,P21),(UE2,R2, P22)},

The rate R1 or R2 is computed dependent on the power Pxy. In one embodiment, the rates are computed based on a physical mode of the links with given powers.

The TEE determines which sets of active links meet or exceed an acceptability threshold at 622 (for example: min SE; power; amount of interfering power at a location, depending on which precoder is used). As can be seen, a large number of parameters need to be determined, so embodiments execute this step heuristically. Links which fail to meet the threshold are discarded at 623. At 624, for links meeting the threshold, the TEE determines a combination of selected sets of active links and allocates resources to each set such that a rate utility is maximized in view of backhaul conditions. Other factors, such as collision probability with other transmissions (due to devices being allocated to different schedulers), are evaluated to determine a transmission strategy, which can include the coordination of schedulers. For example, the TEE selects a transmission setting that maximizes SE such that the UE transmits for a minimal amount of time in order to generate the shortest potential collision. Alternatively, the TEE can select a transmission setting providing a low SE (e.g. lowest MOS and highest power) in order for the interference to be detectable and decodable for SIC at a second reception point.

The TEE then finalizes the transmission strategy at 625. This may include determining which sets of UEs should be controlled together, and from which controllers, and the coordination information that should be provided to the schedulers (e.g. FFR scheme, MCS/power masks, explicit multicasting strategy of decoded data to enable SIC in the case of a limited backhaul, etc). Uplink transmissions are coordinated according to the determined transmission strategy.

Figure 7:
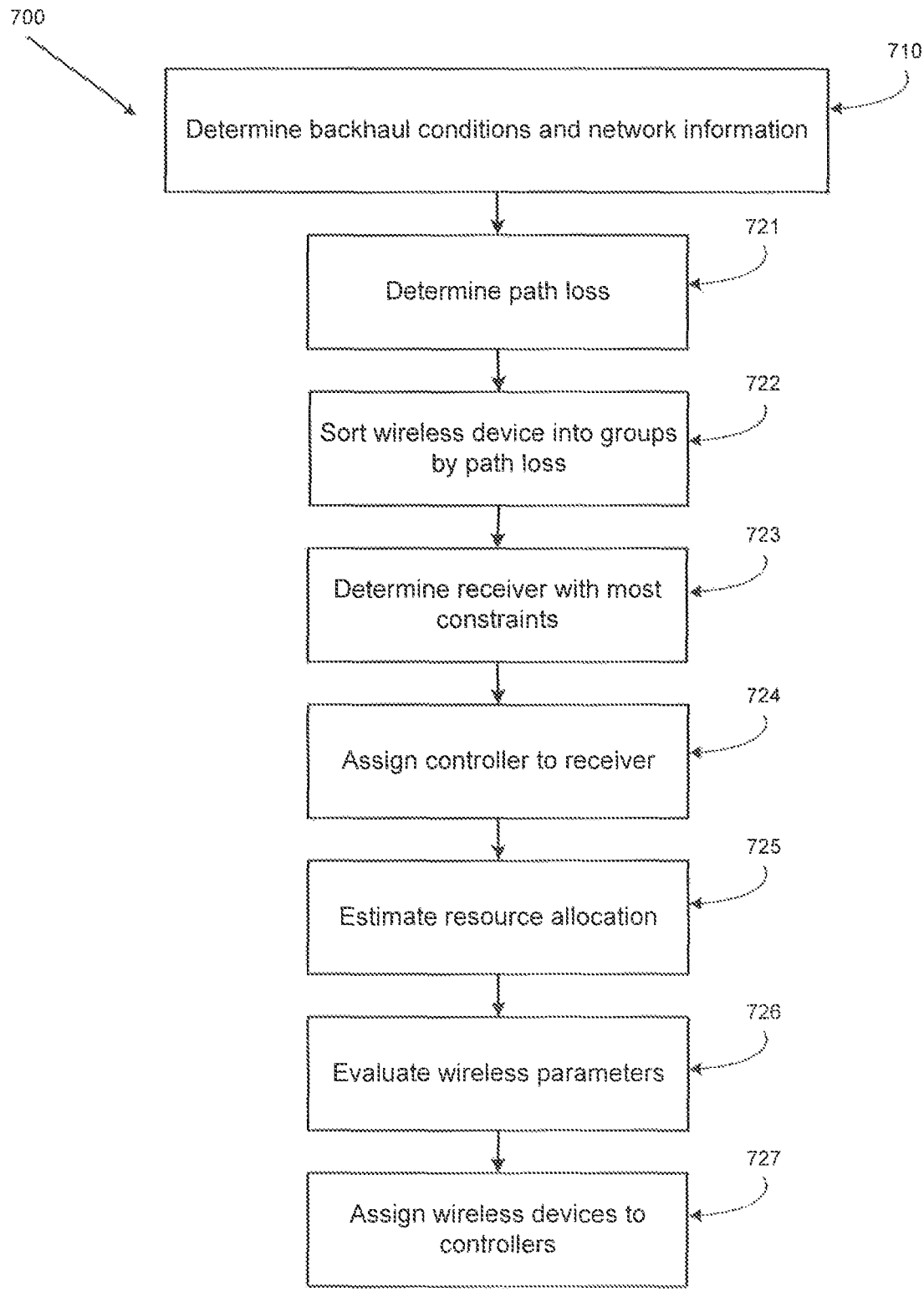
FIG. 7 is a flowchart for co-ordinating uplink data transmissions according to another embodiment.

Referring to FIG. 7, an embodiment of a method 700 for coordinating uplink data transmissions in communications system 100 is shown, where the transmission strategy includes path loss (PL) optimization, for a plurality of wireless devices transmitting to a plurality of receivers. First, backhaul conditions and wireless network information are determined at 710. At 721, the PL is determined for each link, i.e. from each wireless device to each receiver. UEs are sorted into groups at 722 according to some criteria, which in this example is the determined PL. For example, wireless devices are sorted by PL in decreasing order (best PL to worst). In some embodiments, this step is iterative. For example, if the next UE's PL to the best serving receiver of any of the previous wireless devices (sequentially searched) is above a threshold, that wireless device is assigned to the same scheduler group; otherwise, the device is assigned to a different group, which can be a new group. In some embodiments, this is heuristically iterated for all UEs. It should be appreciated that PL is one example criterion which can be used to sort devices (and therefore links) into groups and other embodiments can utilize other criteria.

The TEE determines the receiver having the most constrained backhaul for each group at 723 and assigns a controller to the receiver having the most constrained backhaul for each group at 724. The TEE estimates a resource allocation for each group of wireless devices at 725. This can be estimated heuristically. For example, within each group, the TEE estimates a resource allocation for links between wireless devices and potential receivers which satisfies the most requests for wireless resources within the group. Based on this resource allocation, the TEE re-evaluates the cross interference between scheduler groups and re-evaluates approximate SEs. The TEE then iterates until convergence in order to determine a resource allocation.

From the estimated resource allocation, the TEE evaluates wireless parameters at 726 using a rate utility (e.g. weighted max-min rate, max-sum throughput, etc.) for expected computed rates. Accordingly, the TEE iterates 722-726 to modify the groupings of wireless devices, moving poorly served wireless devices into the next closest scheduling group, while considering the backhaul conditions for each group. It should be noted that 723 and 724 need not be performed for each iteration, but the controller can be reassigned each time a group changes. The TEE configures the transmission strategy for each wireless device according to the rate utilities and expected rates and assigns the wireless devices to controllers at 727. In general, the procedure is iterative in both grouping the UEs, and then in modifying the groups.

In one embodiment, the transmission strategy includes heuristics such as grouping strongly interfering devices together, and applying orthogonal resource allocation on the group to minimize erasure channels or collisions. Such an approach causes individual schedulers to control smaller groups of devices. Remaining interference can be handled using a fine tuned fractional frequency reuse scheme. In one example, UE1 is connected to receiver 1 and UE2 is connected to receiver 2. If UE1 and UE2 strongly interfere with each other, UE1 and UE2 are grouped together in one scheduling group and assigned to the same controller for scheduling, so that they can be scheduled together using orthogonal resources. If UE3 connects to receiver 2, and UE3 causes relatively less interference with UE1 and UE2, then UE3 can be assigned to a different scheduler. FFR masks are assigned to minimize collisions.

Uplink transmissions are coordinated according to the determined transmission strategy. In some embodiments, the TEE continues to receive information about the backhaul conditions and wireless network conditions, and if necessary may dynamically adapt to changing conditions of the network. If necessary, the TEE provides updated scheduling parameters to the schedulers, coordinating the uplink data transmissions on an ongoing basis. In some embodiments, the TEE evaluates a plurality of potential transmission strategies and selects one to use to coordinate the uplink data transmissions. It should be appreciated that FIGS. 5, 6 and 7 each represent one possible strategy, and in some embodiments the TEE can evaluate each (and possibly other strategies) in order to select a transmission strategy for the conditions.

Figure 8:
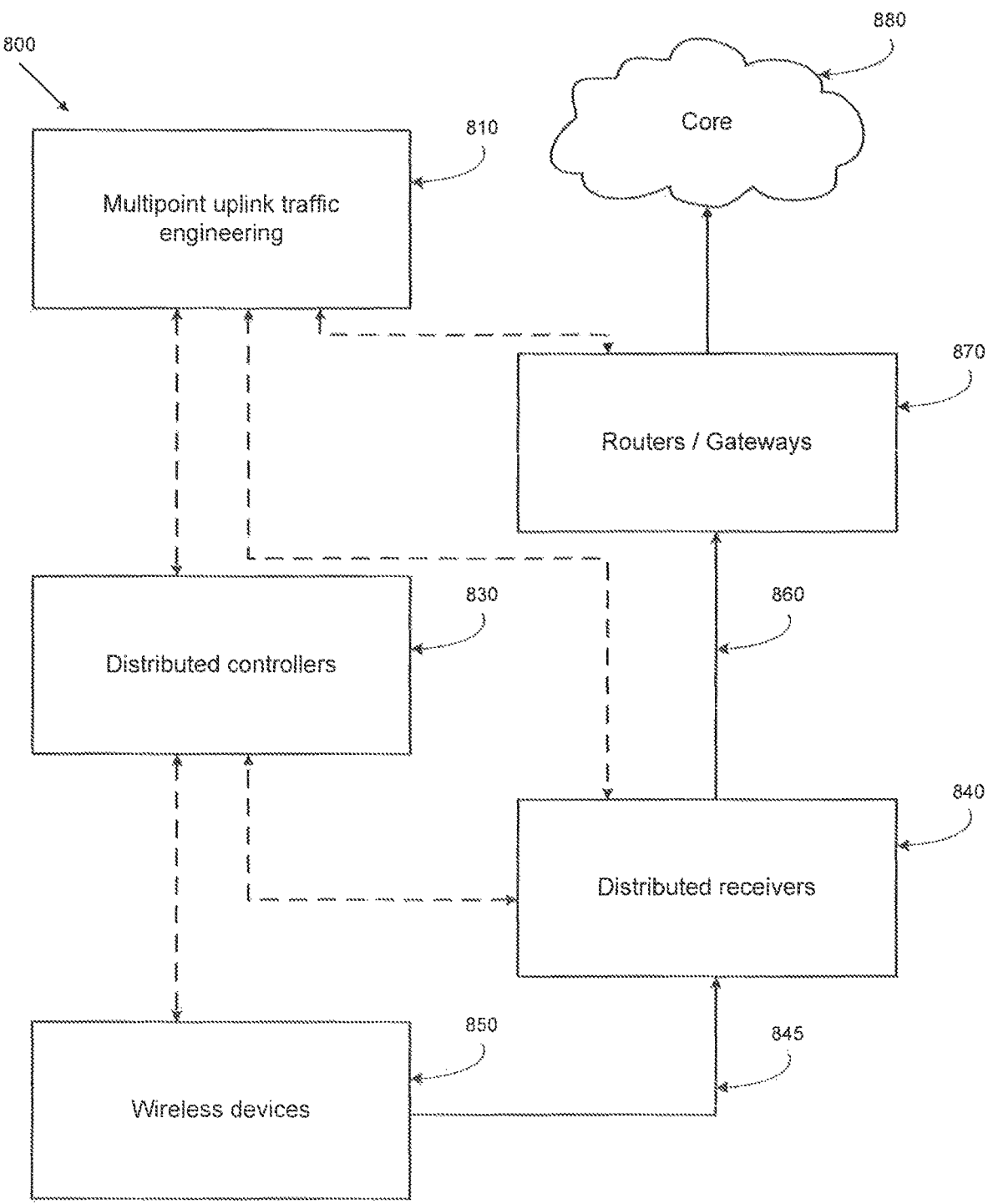
FIG. 8 illustrates a communications network according to another embodiment.

FIG. 8 illustrates an embodiment in which the controllers do not have a one-to-one correspondence with the receivers. In such an embodiment, there is a plurality of controllers 830 separate from, but in communication with, a plurality of receivers 840, and the scheduling function for each receiver is performed by one or more of distributed controllers 930. Schedulers/controllers can be dynamically instantiated as needed, and in proximity to the UEs as needed depending on demand. In such a system, the transmission strategy determined by TEE 810 can include determining where and when to instantiate a scheduler and how to share schedulers between wireless devices 850 and receivers 840. The location of the instantiated schedulers is a compromise between placing them as close to the receivers as possible to minimize delays between computing the grants and having the wireless device receive the grants, and applying joint scheduling for as many wireless devices as possible. In some embodiments, the instantiated controllers can be virtualized network functions established on existing network elements.

In such an embodiment, there is a data plane connection (depicted by solid lines) between distributed receivers 840 and gateway(s) 870 through backhaul network 860. Gateways 870 have a data plane connection with core network 880. There is control plane signalling (depicted by dotted lines) between TEE 810 and the controllers/receivers and the routers/gateways 870, and between distributed controllers 830 and wireless devices 850 and distributed receivers 840. Typically, the schedulers will instruct the receivers when and how to receive transmissions from the wireless devices. However, in some embodiments the TE node can instruct the receivers to listen to and decode signals 845 from the wireless devices, particularly if the TEE has selected a semi-static schedule, for example as discussed with reference to FIG. 5.

Figure 9:
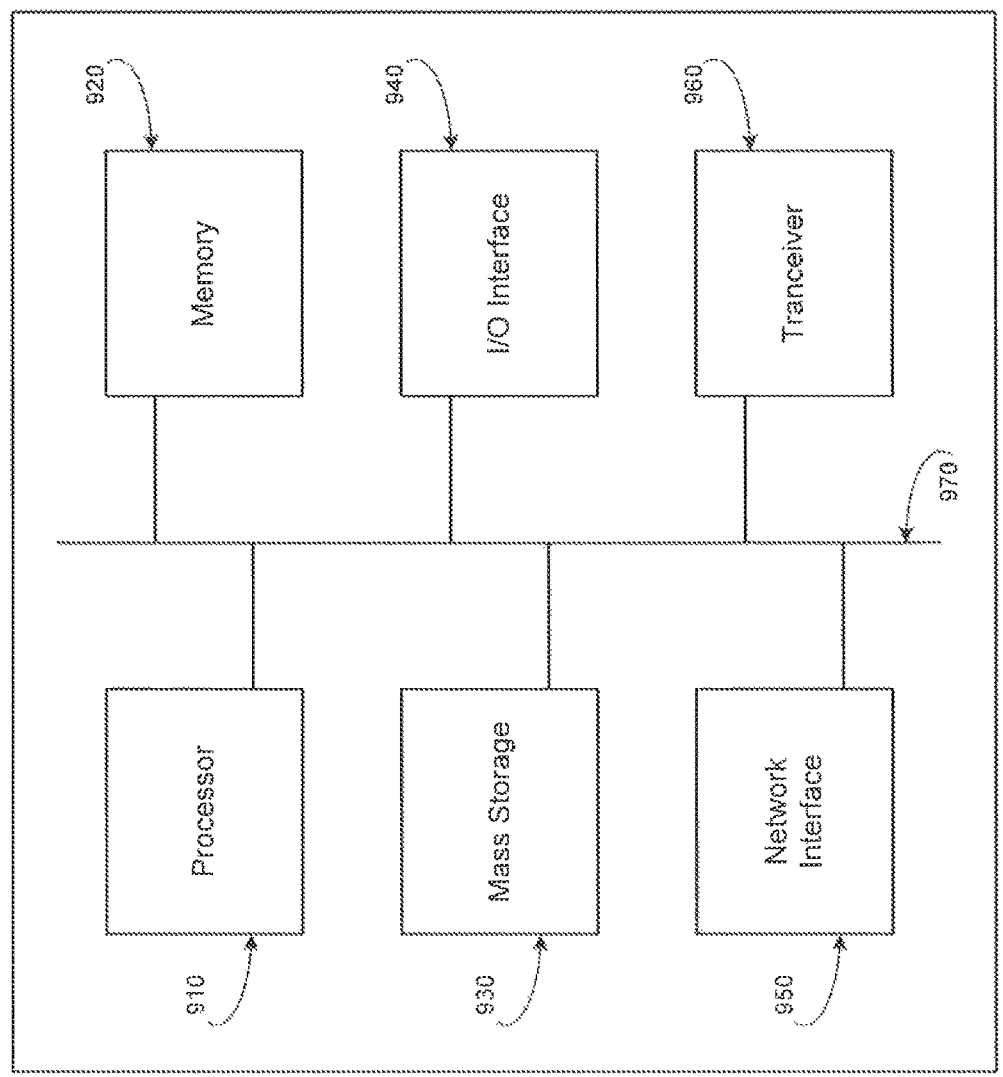
FIG. 9 is a block diagram schematically illustrating a network node according to an embodiment.

FIG. 9 is a block diagram of a processing system 1000 that may be used for implementing components of the communications system 100, such as TEE 160, controllers 130*a*, 130*b*, and UE 105. As shown in FIG. 9, processing system 901 includes a processor 910, working memory 920, non-transitory storage 930, network interface 950, I/0 interface 940 and, depending on the node type, transceiver 960, all of which are communicatively coupled via bi-directional bus 970.

According to certain embodiments, all of the depicted elements may be utilized, or only a subset of the elements. Further, processing system 901 may contain multiple instances of certain elements, such as multiple processors, memories, or transceivers. Also, elements of processing system 901 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, a hard disk drive, a magnetic disk drive, an optical disk drive, a USB drive, or any computer program product configured to store data and machine executable program code. According to certain embodiments, the memory or mass storage has recorded thereon statements and instructions executable by the processor for performing the aforementioned functions and steps of communications system 100, TEE 160, controllers 130*a*, 130*b*, and wireless device 105.

Communications system 100 and components, such as TEE 160, controllers 130*a*, 130*b*, and wireless device 105, can be configured to communicate using various communication protocols, such as TCP/IP level, link level, layer 2, Radio Link Control (RLC), Medium Access Control (MAC) layer, Radio Resource Control (RRC) layer and/or other suitable lower level communication protocols.

Through the descriptions of the preceding embodiments, the present disclosure can be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided in the embodiments of the present disclosure. For example, such an execution may correspond to a simulation of the logical operations as described herein. The software product may additionally or alternatively include a number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations combinations or equivalents that fall within the scope of the present disclosure.

The invention claimed is:

1. A method for balancing data transmissions in a communications system comprising a plurality of receivers and a backhaul network, the method comprising:
receiving a request from a first wireless device for uplink data transmission; determining backhaul conditions of the backhaul network based on information received about the backhaul conditions from network elements of the communications system, including determining the backhaul conditions of a plurality of backhaul links of the backhaul network, each one of the plurality of backhaul links coupling one of the plurality of receivers to a gateway node of the backhaul network interposed between the plurality of receivers and a core network;
obtaining a signal strength of the first wireless device at first and second receivers of the plurality of receivers;
determining a first allocation of the uplink data to be transmitted to the first receiver;
determining a second allocation of the uplink data to be transmitted to the second receiver, each of the first allocation and the second allocation determined in accordance with the backhaul conditions that meet or exceed an acceptable threshold such that a rate utility is maximized and the obtained signal strength of the first wireless device at the first and second receivers; and
coordinating the uplink data transmissions from the first wireless device to the first and second receivers of the plurality of receivers by coordinating a plurality of schedulers based on the determined backhaul conditions, the signal strength of the first wireless device at the first and second receivers, the determined first allocation, and the determined second allocation;
wherein coordinating the uplink data transmissions comprises providing scheduling parameters to the plurality of schedulers.

2. The method of claim 1, wherein:
the plurality of backhaul links comprises a first backhaul link coupling the first receiver to the gateway node and a second backhaul link coupling the second receiver to the gateway node;
determining the backhaul conditions of the plurality of backhaul links comprises determining the first backhaul link is more congested than the second backhaul link;
coordinating the uplink data transmissions comprises instructing the first wireless device to transmit a larger proportion of uplink data to the second receiver than to the first receiver.

3. The method of claim 1 wherein:
the plurality of backhaul links comprises first and second backhaul links;
determining the backhaul conditions of the plurality of backhaul links comprises
determining available bandwidth for each of the first and second backhaul links; and
coordinating the uplink data transmissions comprises instructing the first wireless device to transmit the uplink data to each of the first and second receivers at transmission rates matching the available bandwidth of their respectively connected backhaul links.

4. The method of claim 1 wherein:
determining the backhaul conditions of the plurality of backhaul links comprises determining one of the plurality of the backhaul links has relatively greater backhaul congestion; and
coordinating the uplink data transmissions comprises instructing the first wireless device to transmit a smaller proportion of the uplink data to the one of the first receiver and the second receiver that is coupled to the determined one of the backhaul links.

5. The method of claim 1 further comprising:
computing the scheduling parameters dependent on said backhaul conditions, the determined first allocation, and the determined second allocation, and the signal strength of the first wireless device at the first and second receivers;
wherein coordinating the uplink data transmissions comprises providing the scheduling parameters to the plurality of schedulers for scheduling the first wireless device to transmit the uplink data to the first and second receivers consistent with the scheduling parameters.

6. The method of claim 5 further comprising;
instantiating the plurality of schedulers as needed; and
associating the plurality of schedulers with the first and second receivers,
wherein the plurality of schedulers instruct the first wireless device to transmit the uplink data to the first and second receivers.

7. The method of claim 6 wherein scheduling the first wireless device to transmit the uplink data to the first receiver comprises transmitting grants from the plurality of schedulers to the first wireless device, where said grants are constrained by the scheduling parameters.

8. The method of claim 1, further comprising determining a transmission strategy according to the backhaul conditions, wherein coordinating the uplink data transmissions is performed according to the determined transmission strategy.

9. The method of claim 8 further comprising determining wireless network information, and wherein determining the transmission strategy comprises determining the transmission strategy according to the determined backhaul conditions and the determined wireless network information.

10. The method of claim 9 wherein wireless network information is selected from the group consisting of: channel state information, spectral efficiency, signal to noise ratio, service demands from user equipment, receiver status, reception quality, loading, path losses, active flows, and uplink characteristics.

11. The method of claim 1 further comprising determining wireless network information, and wherein receiving the request, determining the backhaul conditions, determining wireless network information and coordinating network transmissions are executed by a traffic engineering element (TEE).

12. The method of claim 1 further comprising a traffic engineering element (TEE) computing the scheduling parameters dependent on the backhaul conditions and wireless network conditions;
wherein coordinating the uplink data transmissions comprises the TEE providing scheduling parameters to the plurality of schedulers for scheduling a plurality of wireless devices including the first wireless device to transmit uplink data to the plurality of receivers including the first and second receivers; and
wherein the plurality of schedulers compute and transmit grants to the plurality of wireless devices, wherein said grants are constrained by the scheduling parameters.

13. The method of claim 12 wherein said TEE continues to determine ongoing changes to the backhaul conditions and wireless network conditions, and provides updated scheduling parameters to the schedulers, to coordinate the uplink data transmissions on an ongoing basis.

14. The method of claim 11, wherein said TEE evaluates a plurality of potential transmission strategies and selects one to use to coordinate the uplink data transmissions.

15. The method of claim 12 further comprising the TEE instantiating the plurality of schedulers in the network as needed to satisfy requests from the plurality of wireless devices;
wherein said schedulers are located proximate to a group of wireless devices so that they can be scheduled as a group.

16. The method of claim 15 wherein the instantiated plurality of schedulers need not have a one-to-one correspondence with the plurality of receivers.

17. The method of claim 16 wherein the instantiated schedulers need not have a one-to-one correspondence with wireless devices.

18. The method of claim 12 wherein the plurality of schedulers determine rates of data, power masks and Modulation and Coding Scheme (MCS) masks for uplink transmissions in order to enable proper reception at the plurality of receivers while balancing wireless and backhaul resources.

19. A traffic engineering element (TEE) comprising:
a network interface for communicating with network elements to receive information about backhaul conditions of a backhaul network, for receiving wireless network information, and for receiving uplink requests from wireless devices;
a processor; and
machine readable memory storing executable instructions for execution by said processor, said executable instructions, when executed, cause said TEE to: instantiate a plurality of schedulers and associate one or more instantiated schedulers with one or more of receivers;

determine the backhaul conditions of the backhaul network based on the received information, including determining the backhaul conditions of one or more backhaul links of the backhaul network, each one of the one or more backhaul links coupling one of the one or more receivers to a gateway node of the backhaul network interposed between the one or more receivers and a core network;

obtain a signal strength of a wireless device at first and second receivers of the one or more receivers;

determine a first allocation of uplink data to be transmitted to the first receiver;

determine a second allocation of the uplink data to be transmitted to the second receiver, each of the first allocation and the second allocation determined in accordance with the backhaul conditions that meet or exceed an acceptable threshold such that a rate utility is maximized and the obtained signal strength of the wireless device at the first and second receivers; and coordinate the uplink data transmissions from the wireless device to the first and second receivers of the one or more receivers dependent on the determined backhaul conditions the wireless network information, the signal strength of the wireless device at the first and second receivers, the determined first allocation, and the determined second allocation by providing scheduling parameters to the plurality of schedulers and coordinating the plurality of schedulers in order to balance traffic on the backhaul network.

20. The traffic engineering element as claimed in claim 19, wherein said instructions further cause said TEE to:

compute the scheduling parameters dependent on said backhaul conditions and said wireless network information; and provide said scheduling parameters to the plurality of schedulers for scheduling the wireless devices to transmit the uplink data to the one or more receivers consistent with the scheduling parameters.

21. The traffic engineering element as claimed in claim 20 wherein the instructions cause said schedulers to compute and transmit grants to at least one wireless device, wherein said grants are constrained by the scheduling parameters.

22. The traffic engineering element as claimed in claim 20 wherein said instructions further cause said TEE to instantiate the plurality of schedulers as needed.

23. The traffic engineering element as claimed in claim 22 wherein said instructions cause said instantiated schedulers to implement a semi-static schedule for each receiver and to instruct the receivers to listen to and decode the uplink data transmissions from the wireless devices according to said semi-static schedule.

24. The traffic engineering element as claimed in claim 22 wherein said instructions cause said instantiated schedulers to:

determine rates of data, power masks and Modulation and Coding Scheme (MCS) masks for the uplink data transmissions in order to enable proper reception at the one or more receivers while balancing wireless and backhaul resources.

* * * * *

UNITED STATES PATENT AND TRADEMARK OFFICE
CERTIFICATE OF CORRECTION

PATENT NO. : 10,506,466 B2  
APPLICATION NO. : 14/827819  
DATED : December 10, 2019  
INVENTOR(S) : Philippe Leroux and Aaron Callard Page 1 of 1

It is certified that error appears in the above-identified patent and that said Letters Patent is hereby corrected as shown below:

In the Specification

Column 5, Line 13:
"(Le world-" should read --(i.e. world- --

Column 5, Line 14:
"wide interoperably" should read --wide interoperability--

Column 10, Line 1:
"controllers 130a, 130b can include" should read --controllers 300a, 300b can include--

Column 11, Line 40:
"(e.g. lowest MOS" should read --(e.g. lowest MCS--

Column 13, Line 37:
"network interface 950, I/0 interface" should read --"network interface 950, I/O interface"--

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*